United States Patent [19]

Dartey et al.

[11] Patent Number: 4,894,246

[45] Date of Patent: * Jan. 16, 1990

[54] PROCESSES AND DOUGH COMPOSITIONS FOR PRODUCING COOKIES CONTAINING LOW-MELTING FAT

[75] Inventors: Clemence K. Dartey, Oakland; John W. Finley, Whippany; Robert R. Thulin, Wyckoff, all of N.J.

[73] Assignee: Nabisco Brands, Inc., East Hanover, N.J.

[ * ] Notice: The portion of the term of this patent subsequent to Feb. 2, 2005 has been disclaimed.

[21] Appl. No.: 82,540

[22] Filed: Aug. 7, 1987

Related U.S. Application Data

[63] Continuation of Ser. No. 786,097, Oct. 10, 1985, Pat. No. 4,722,849.

[51] Int. Cl.$^4$ .................. A21D 8/00; A21D 13/00
[52] U.S. Cl. ........................ 426/94; 426/549; 426/606
[58] Field of Search ............... 426/94, 549, 606

[56] References Cited

U.S. PATENT DOCUMENTS

| | | | |
|---|---|---|---|
| 3,459,777 | 8/1969 | Seiden et al. | 426/607 |
| 4,344,969 | 8/1982 | Youngquist | 426/18 |
| 4,360,534 | 11/1982 | Brabb et al. | 426/94 |
| 4,444,799 | 4/1984 | Vanderveer et al. | 426/549 |
| 4,455,333 | 6/1984 | Hong et al. | 426/94 |
| 4,455,333 | 6/1984 | Hong et al. | 426/94 |
| 4,456,625 | 6/1984 | Durst | 426/106 |
| 4,503,080 | 3/1985 | Brabb et al. | 426/94 |
| 4,511,318 | 4/1985 | Kolodesh et al. | 426/94 |
| 4,511,585 | 4/1985 | Durst | 426/106 |
| 4,514,430 | 4/1985 | Hartman | 426/560 |
| 4,528,900 | 8/1985 | Simelunas . | |
| 4,534,726 | 8/1985 | Simelunas | 425/363 |
| 4,578,027 | 3/1986 | Koppa et al. | 425/298 |
| 4,579,744 | 4/1986 | Thulin | 426/283 |
| 4,582,711 | 4/1986 | Durst | 426/128 |
| 4,596,714 | 6/1986 | Brabbs | 426/297 |
| 4,624,856 | 11/1986 | Vanderveer | 426/549 |
| 4,664,921 | 5/1987 | Seiden | 426/94 |
| 4,668,522 | 5/1987 | Cappel et al. | 426/94 |
| 4,722,849 | 2/1988 | Dartey et al. | 426/94 |

FOREIGN PATENT DOCUMENTS

| | | |
|---|---|---|
| 0031718 | 2/1981 | European Pat. Off. . |
| 0138414 | 4/1985 | European Pat. Off. . |
| 0163496 | 12/1985 | European Pat. Off. . |
| 0191693 | 8/1986 | European Pat. Off. . |
| 4804543 | 2/1973 | Japan . |
| 4804544 | 2/1973 | Japan . |

OTHER PUBLICATIONS

Kleinert, "Studies on the Formulation of Fat Bloom and Methods of Delaying It," Rev. Inter. Chocotat, vol. 16, pp. 345–368. (1961).

*Primary Examiner*—Joseph Golian
*Attorney, Agent, or Firm*—Richard Kornutik

[57] ABSTRACT

A low-melting fat, which has a solid fat index of less than 13 at 80° F., and which is essentially completely liquid at about 100° F., is added to cookie dough containing flavor particles, such as chocolate chips, raisins, cherries or berries, in such an amount that the low-melting fat comprises from 5 to 30 percent by weight of the total weight of fat and/or shortening in the dough. The low-melting fat reduces halo effects in the resulting cookie.

26 Claims, No Drawings

PROCESSES AND DOUGH COMPOSITIONS FOR PRODUCING COOKIES CONTAINING LOW-MELTING FAT

This application is a continuation of application Ser. No. 786,097, filed Oct. 10, 1985, which issued Feb. 2, 1988 as U.S. Pat. No. 4,722,849.

FIELD OF THE INVENTION

This invention relates to processes and dough compositions for producing cookies containing a low-melting fat. More specifically, this invention relates to processes and dough compositions for producing cookies which are less subject to halo effects and which have a firm texture. The invention is especially intended for use in cookies having high moisture contents, since such cookies are particularly susceptible to halo effects when flavor particles are present.

BACKGROUND OF THE INVENTION

It is common practice to include in cookies particles of flavoring materials which remain in the baked cookie as discrete, heterogeneous particles. Such flavor particles may include chocolate chips, butter-scotch chips, caramel chips, raisins, nuts, cherries, and various types of berries such as blueberries and raspberries. The presence of such flavor particles in the cookie enhances the flavor and consumer acceptability of the cookies.

Unfortunately, the presence of the flavor particles as heterogeneous inclusions forming a phase distinct from the substantially homogeneous dough portion of the cookie may result in one or both of two undesirable effects in the cookie. The first of these effects is a so-called "bloom", which appears as a whitish deposit, either in the form of discrete particles or a continuous layer, covering parts of the surfaces of the flavor particles. The second undesirable effect is the so-called "halo" effect which consists of a marked lightening in color in the parts of the cookie adjacent the surfaces of the flavor particles or on the surface of the cookie in parts of the cookie where the flavor particles are covered only by a thin crust. Although neither the bloom nor the halo effect poses any health risk (the cookies are still safe to eat), both do tend to make the cookies esthetically unappealing. Bloom and halo effects are especially visible in chocolate chip cookies. The dark color of the chocolate chips makes any bloom thereon highly visible, thus giving rise to the so-called "blonde chocolate chip" phenomenon well-known to those skilled in the art. Blonde chocolate chips are mainly experienced in cookies having high moisture contents and relatively low levels of fat or shortening. The dark color of the chocolate chips also makes any lightening of the cookie caused by the halo effect highly visible. Bloom may also cause a serious problem in high moisture raisin cookies and in English muffins containing raisins; in these cases, not only does the dark color of the raisins make any bloom highly visible, but the high moisture content of the raisins appears to facilitate the development of bloom.

It is believed that fat bloom results from the formation of crystals of fat on the surface of the flavor particles, and that halo effects are caused by changes in the form of the sugar crystals on the dough portion of the cookie. Also, it appears that cookies of high moisture content are more susceptible to both fat bloom and halo effects than cookies with lower moisture contents. Fat bloom occurs in chocolate or chocolate products which have been subjected to improper tempering or too sudden cooling. Fat bloom also may occur in chocolate chip cookies formulated with a high proportion of liquid shortening (oil). It is believed that during storage of such cookies, the oil migrates to the surface of the cookies and comes into contact with the chocolate chips. The oil in contact with the chocolate chips exerts a eutectic effect on the cocoa butter in the chips, causing them to soften. The cocoa butter then undergoes polymorphic changes during storage leading to the development of fat bloom on the chocolate chips on the surface of the cookies.

Halo effects may develop when dew or moisture condensation occurs on the cookies during the cooling and packaging stages which follow baking. Sugar crystals in the vicinity of the condensed moisture are dissolved, and when the surface moisture evaporates minute sugar crystals become visible as rings which surround flavor particles such as chocolate chips. It is believed that water collects on the cookie surface around the flavor particles by condensing on the raised portion and flow down to the area surrounding the flavor particle. It may also be caused by differences in heat capacities and cooling rates between the flavor particles and the surrounding baked dough or by flow of moisture from within the cookie around the flavor particle.

Attempts to eliminate these effects are greatly handicapped by the unpredictability of the effects. Even though the ingredients and the proportions of ingredients in successive batches of the same cookies are kept as constant as possible in large-scale cookie production plants, the unavoidable slight variations in formulation, processing and storage conditions may cause bloom and halo effects to occur in a few batches of cookies from a specific plant, while the remaining, supposedly identical, batches from the same plant are free of these defects. Moreover, since bloom and halo effects may only become visible after the cookies have been packed, it is difficult to prevent cookies suffering from these effects reaching the consumer.

There is thus a need for a process for making cookies containing flavor particles less susceptible to bloom and halo effects, and this invention provides such a process.

This invention provides a process and a dough composition for producing multi-textured cookies which retain a firm texture in their outer layer at high water contents and which are bloom and halo resistant during storage.

SUMMARY OF THE INVENTION

This invention provides a process for preparing a cookie, which process comprises mixing flour, a sugar, flavor particles, fat or shortening and a low-melting fat to produce a cookie dough, the low-melting fat having a solid fat index of less than 13 at 80° F. (26.7° C.) and being essentially completely liquid at about 100° F. (37.8° C.), the low-melting fat comprising from about 5 to about 30 percent by weight of the total weight of fat and shortening (exclusive of the low-melting fat) in the cookie dough, and baking the cookie dough to form a cookie.

This invention also provides a cookie dough composition comprising flour, a sugar, flavor particles, fat or shortening and the aforementioned low-melting fat, the low-melting fat comprising from about 5 to about 30 percent by weight of the total weight of fat and shortening (exclusive of the low-melting fat) in the cookie dough composition.

The term "flavor particles" is used herein to denote any particles added to cookies for flavoring purposes which remain as discrete, heterogeneous inclusions in the baked cookie, and which may render the cookie susceptible to bloom and/or halo effects. Thus, the term includes, inter alia, chocolate chips, butter-scotch chips, caramel chips, raisins, nuts, cherries and berries such as blueberries and raspberries.

This invention also provides a process for preparing a multi-textured cookie, which process comprises mixing flour, a humectant and fat or shortening to form a first cookie dough, mixing flour, a sugar, fat or shortening and the aforementioned low-melting fat to form a second cookie dough, the low-melting fat comprising from about 5 to about 30 percent by weight of the total weight of fat and shortening (exclusive of the low-melting fat) in the cookie dough, enrobing a portion of the first cookie dough within a portion of the second cookie dough to produce a composite dough piece, and baking this composite dough piece to form a multi-textured cookie with a center have a soft-textured texture and a firm outer layer.

Finally, this invention provides a cookie dough composition for producing a multi-textured cookie, the cookie dough composition comprising a center formed of a first cookie dough comprising flour, a humectant and fat or shortening and bakeable to a soft texture, and an outer layer formed of a second cookie dough comprising flour, a sugar, fat or shortening and the aforementioned low-melting fat, the low-melting fat comprising from about 5 to about 30 percent by weight of the total weight of fat and shortening (exclusive of the low-melting fat) in the second cookie dough, this second cookie dough being bakeable to a firm texture.

The low-melting fat used in the processes and compositions of the present invention desirably has a solid fat index of from about 18 to 31 at 50° F. (10° C.) and, a solid fat index of from about 7 to about 11 at 80° F. (26.7° C.).

DETAILED DESCRIPTION OF THE INVENTION

It has been found that the inclusion of an appropriate quantity of a low-melting fat in a dough used to produce a flavor particle cookie (which can be a single-textured or multi-textured flavor particle cookie) renders the resulting cookie less susceptible to halo and bloom effects. It has also been found that, if the quantity of the low-melting fat is included in the dough used to produce the outer layer of a multi-textured cookie (which may or may not contain flavor particles), the resultant outer layer has a firm texture, which is retained upon storage in a closed package, so preserving the contrast between the soft-textured center and the firm outer layer of the multi-textured cookie.

In the processes and compositions of the present invention, the low-melting fat comprises from about 5 to about 30 percent by weight of the total weight of fat and shortening in the cookie dough to which it is added. If the low-melting fat comprises less than about 5 percent by weight of the total weight of fat and shortening in the dough to which it is added, it is generally ineffective in achieving the desired objectives of substantial reduction or elimination of halo effects. Adding such a large amount of low-melting fat that it comprises more than about 30 percent by weight of the total weight of fat and shortening makes the dough to which it is added too soft and results in excessive oven spread during baking. Also, the use of too large of a quantity of low-melting fat may tend to cause exudation of oil from the baked cookie, causing an unpleasant oily feel when the cookie is picked up in the finger, and an oily mouth feel when the cookie is eaten. In addition, too large a quantity of low-melting fat can induce fat bloom in cookies containing chocolate chips which appear on the surfaces of the cookies.

Although the optimum amount of low-melting fat to achieve the desired objectives without causing the aforementioned problems may vary considerably with the exact composition of the dough to which the low-melting fat is added (and in particular with the exact type and amount of fat or shortening used in the dough), in general it has been found that adding a quantity of low-melting fat which results in the low-melting fat comprising from about 12 to about 25 percent by weight of the total weight of fat and shortening (exclusive of the low-melting fat) in the dough to which the low-melting fat is added gives good results. The optimum amount of low-melting fat tends to be about 20 percent by weight of the total weight of fat and shortening in the relevant dough.

If it is found that the quantity of low-melting fat needed to suppress halo effects and to maintain a firm texture in the outer layer of a multi-textured cookie tends to make the oven spread of the dough excessive, the oven spread can be reduced by reducing the proportion of sugar and/or water (if any) present in the dough to which the low-melting fat is added, or using sugar with a larger average particle size.

When a cookie dough is modified to include a low-melting fat in accordance with the present invention, it has been found that good results are usually obtained by making the total proportion of fat, shortening and low-melting fat in the modified dough greater than the total proportion of fat and shortening in the unmodified dough i.e. at least part of the low-melting fat should be used in addition to the existing fat and/or shortening, rather than the whole of the low-melting fat simply being used to replace an equivalent quantity of fat and/or shortening. Indeed, it has been found that good results are obtained if the low-melting fat is added in addition to the existing fat or shortening, the original proportions of fat or shortening being retained. For example, a dough for the outer layer of a multi-textured cookie may contain 100 parts by weight of flour, 70 parts of sugar and 50 parts by weight of vegetable shortening. To modify this dough in accordance with the present invention, these amounts of flour, sugar and vegetable shortening may be retained and an additional 10 parts by weight of low-melting fat added.

As already noted, the low-melting fat used in the processes and dough compositions of the present invention preferably has a solid fat index of about 18 to 31 percent at 50° F. (10° C.) and about 7 to about 11 percent at 80° F. (26.7° C.). Thus, the low-melting fats used in the processes and compositions of the present invention differ in physical properties from the shortenings normally used in cookies. Such shortenings typically have a solid fat index of about 15 to about 25 percent at 70° F. and are solid up to at least about 80° F. Typically, at least 50 percent by weight of the fatty acids in such low-melting fats are unsaturated. Examples of vegetable oils or blends of vegetable oils from which such partially hydrogenated low-melting fats can be prepared are soybean oil, palm oil, sunflower oil, rapeseed oil, safflower oil, corn oil, cottonseed oil and the like.

Partially hydrogenated vegetable oils suitable for use as the low-melting fats in the processes and compositions of the present invention are readily available commercially. Such low-melting fats have previously been used as spray oils in, for example, the spraying of crackers with oil. (It should be noted that, although such materials are referred to in the food industry as "spray oils", they are solid at room temperature.) Although we recommend the use of such commercially-available spray oils as the low-melting fat in the processes and compositions of the present invention, we do not exclude the possibility that some edible low-melting fats may be used in the present invention notwithstanding the fact that they possess certain properties (e.g. color) which make them unsuitable for use in the spraying of crackers or other conventional uses of spray oils. In the present invention the oils are incorporated throughout the dough prior to baking, not sprayed on to the surface of previously-baked cookies.

As already mentioned, when a low-melting fat is incorporated into a dough in accordance with the present invention, desirably at least part of the low-melting fat is used to increase the total amount of the shortening, fat and low-melting fat in the dough rather than simply being used to replace the equivalent weight of fat or shortening. When the present invention is applied to the outer layer of a multi-textured cookie, it has also been found advantageous to increase the proportion of fat and/or shortening in the center of the multi-textured cookie to reduce the tendency for fat migration and to eliminate or decrease any discoloration (blonding) or bloom effects of the flavor particles within the cookies. A filler dough for a multi-textured cookie may contain about 38 parts by weight of shortening for each 100 parts by weight of flour. In preparing a multi-textured cookie by the process of the present invention, it is desirable to increase the amount of shortening to at least 42 percent by weight of the weight of flour in the filler dough, and further increases in the amount of fat or shortening will, at least in some cases, result in further suppression of bloom effects. For example, the filler dough used in Example 1 below contains 47.5 percent by weight of shortening based upon the weight of flour in the filler dough in order to suppress bloom effects or blonding of the chocolate chips.

As already mentioned, chocolate chip cookies are especially susceptible to highly visible bloom and halo effects, and thus this invention is especially useful in the production of chocolate chip cookies.

It has been found that the tendency for blonde chocolate chips to occur in chocolate chip cookies can be further reduced or eliminated by controlling the compositions of the chocolate chips themselves. Chocolate chips used in cookies usually contain about 28 percent cocoabutter. It has been found that any remaining tendency for blonde chocolate chips to occur, despite the inclusion of a low-melting fat and optionally additional fat/shortening in the dough compositions of the present invention, can be reduced or eliminated by using chocolate chips containing in excess of about 30 percent cocoabutter and preferably about 34 percent cocoabutter. However, although such an increase in the cocoabutter content of the chocolate chips helps to overcome the blonde chocolate chip problem, when high levels of vegetable fat are present in the dough, the high cocoabutter chocolate chips tend to exhibit fat bloom on the surface of such cookies.

A more satisfactory modification of the chocolate chips to reduce or eliminate any remaining tendency for blonde chocolate chips to occur is inclusion in the chocolate chips of butterfat. The quantity of butterfat included in the chocolate chips should be at least 2 percent by weight of the chips, and preferably from 2 to 6 percent by weight of the chips, the optimum amount usually being about 4 percent by weight of the chips.

Alternatively, or in addition, there may also be included in the chocolate chips an emulsifier, since it has been found that the addition of such an emulsifier also helps to reduce or eliminate any remaining tendency for blonde chocolate chips to occur. The amount of emulsifier added is desirably at least 0.5 percent, and preferably about 1, percent by weight of the chocolate chips. Suitable emulsifiers include, for example, sorbitan monostearate, and polyoxyalkylene sorbitan fatty acid esters, such as polysorbate 60 (polyoxyethylene(20) sorbitan monostearate).

To further reduce or eliminate halo and blonde chocolate chip problems, an emulsifier may also be added to the cookie dough. In multi-textured cookies the emulsifier should be added to the casing dough and may also be included in the filler dough. The emulsifiers mentioned above for use in the chocolate chips may also be added to the cookie doughs. The amount of emulsifier or blend of emulsifiers added to the or each cookie dough is preferably at least 1, and desirably about 2, percent by weight of the flour in the dough.

The flour and fat or shortening employed in the dough(s) used in the processes and compositions of the present invention are selected from conventional product lines. The flour component may be any comminuted cereal grain or edible seed meal or combination thereof, such as wheat flour, corn flour, corn starch, modified starch, rice flour, potato flour, barley flour or the like. Wheat flour is preferred, and may be bleached or unbleached. Bleached flour tends to produce less oven spread during baking. The shortening may be any edible fat or oil or mixtures thereof suitable for baking applications, and may further include conventional food-grade emulsifiers. The shortening may be present in the or each dough in amounts ranging from about 20 percent to about 80 percent by weight of flour in the dough.

The or each dough may contain up to about 5 percent by weight of a leavening system, based upon the weight of flour in the dough. When multi-textured cookies are produced by the process of the invention, the leavening system employed in each dough may be the same or different.

In addition to the foregoing, the dough(s) used in the processes and compositions of the invention may include other additives conventionally employed in cookies. Such additives may include, for example, milk products or milk by-products, egg or egg by-products, cocoa, vanilla, cereal (oatmeal) as well as the flavor particles. When multi-textured cookies are prepared by the process of the invention, such multi-textured cookies may contain conventional flavor particles in either or both cookie doughs.

The dough(s) can each be prepared in a conventional manner using a creaming stage and a dough-forming stage. The low-melting fat is conveniently added to the creaming stage with the fat or shortening. The low-melting fat and the fat or shortening are conveniently mixed with at least part of the sugar in the creaming stage, and thereafter the flour and any remaining sugar is added to form the finished cookie dough. If flavor chips are to be added, they are preferably added as the last ingredient to the dough with minimal mixing so as to avoid smearing of the flavor chips into the dough.

The sugar used in a single-dough cookie or in the casing dough of a multi-textured cookie produced by the process of the invention desirably contains a minor proportion of dextrose, a reducing sugar which promotes browning and hence helps to create the conventional brown color in the baked cookie.

In the process of the invention, the time and temperature of baking are adjusted in accordance with conventional techniques to provide a moisture content in the baked cookie of 6 percent or more. The preferred moisture content ranges from about 6.5 percent to about 7.5 percent based upon the weight of the baked cookie. The water activity of the baked cookie should be less than about 0.7, preferably less than or equal to about 0.6, to assure microbial shelf stability. While baking times and temperatures will vary for different dough formulations, oven types, etc., in general commercial cookie baking times may range from about 5 minutes to about 15 minutes and the oven baking temperatures for cookies may range from about 250° F. (121° C.) to about 650° F. (343° C.).

When using the process of the invention to produce multi-textured cookies, the filler dough may be any of the cookie doughs known to be capable of producing a soft texture in the center of a multi-textured cookie. As is well known to those skilled in the art a soft texture in the center of a multi-textured cookie can be achieved by including a humectant in the filler cookie dough used to produce this center. When appropriate types and amounts of humectants are added to a cookie dough, the product baked from such dough will possess a plastic, moist and non-hardening crumb structure, which will be retained during storage in conventional packing for periods greater than two weeks and possibly up to several months.

A wide variety of food-compatible humectants may be employed for imparting a shelf-stable soft texture to the centers of the multi-textured cookies produced by the process of the present invention. Humectants which can be employed include sugar and/or non-sugar ingredients which bind moisture in a baked dough. If a non-sugar humectant is employed, the filler cookie dough may also need to include a sugar to provide the requisite degree of sweetness to the center of the cookie. The binding should be such that the equilibrium rate of moisture loss from the cookie to the environment due to the presence of the humectant is slowed to such a degree that a multi-textured cookie containing the humectant in its center, and having an initial moisture content of at least about 6 percent, retains in its center a soft and pliable texture for at least about 2 weeks, when stored in a closed container.

Edible humectant gels such as a humectant sucrose gel and/or a high fructose corn syrup gel can be used in the filler cookie dough, preferably along with other humectant materials for achieving a soft texture which is stable for prolonged periods. Preparation of the gels and of doughs containing them for producing soft edible baked products having extended shelf life is taught in U.S. Pat. No. 4,444,799. A humectant sucrose gel can be prepared, for example, from a mixture of sucrose syrup, sodium alginate, and a calcium ion source. The gels may also be prepared as taught in pending U.S. application Ser. No. 712,206 filed Mar. 15, 1985, now U.S. Pat. No. 4,624,856, which is a continuation of application Ser. No. 580,365, filed Feb. 15, 1984, now abandoned which in turn is a continuation-in-part of the application which issued as U.S. Pat. No. 4,444,799. The aforementioned patent and pending application are both incorporated herein by reference in their entirety.

In accordance with the teachings of U.S. application No. 712,206, now U.S. Pat. No. 4,624,856 a firm gel, capable of being ground is obtained by admixing: (a) from about 0.25 parts by weight to about 4.0 parts by weight, preferably from about 0.5 parts by weight to about 1.5 parts by weight of an edible gum capable of being set by calcium ions, and (b) from about 0.1 parts by weight to about 4 parts by weight, preferably from about 0.25 parts by weight to about 1.0 parts by weight of a calcium ion source, said parts being based upon 100 parts by weight of the edible viscous liquid. The ingredients are admixed under high shear mixing conditions which assures an at least substantially lump-free and homogeneous gel.

The edible firm, elastic or rubbery gel is ground into pieces typically at temperatures of from about 65° F. to about 85° F. The ground gel is incorporated into a dough using conventional mixing techniques known in the bakery art. The ground gel which is incorporated into the dough is not discernible as pieces in the baked good upon consumption. The amount of water used to produce the gels generally ranges from about 15% by weight to about 35% by weight, based upon the total weight of the gel.

A humectant gel for use in the present invention can be prepared by using sucrose syrup and/or high fructose corn syrup as the edible viscous liquid, sodium alginate as the edible gum, and food grade calcium sulfate dihydrate as the calcium ion source. Other gums which may be employed include potassium alginate, ammonium alginate, carrageenan, guar gum, locust bean gum, starch, protein, Xanthan gum, mixtures thereof, and the like. Other calcium ion sources which may be employed include food grade monocalcium phosphate anhydrous, calcium sulfate, calcium carbonate, calcium lactate, calcium monohydrogen phosphate, dicalcium orthophosphate dihydrate, tricalcium phosphate, calcium chloride, mixtures thereof, and the like. Weight ratios of sodium alginate/edible calcium ion source in the range of about 1 to 3 are generally used. Propylene glycol and glycerine may be used as dispersing agents for the calcium source or the sodium alginate.

Humectant sugars may be employed alone or in combination with non-humectant sugars (such as sucrose) in the filler cookie dough to impart a soft texture to the center of the multi-textured cookie. Suitable humectant sugars include fructose, lactose, dextrose, corn syrups, invert syrups, high fructose corn syrups, honey, molasses, as well as mixtures of one or more of the foregoing humectants with sucrose. For example, a suitable humectant sugar composition for use in the filler cookie dough may comprise about 0 to 87 percent sucrose, with the balance of the sugar being comprised of fructose employed in the form of crystallized sugar. Alternatively, the balance of the sugar may be provided by the sugar solids content of a corn syrup, honey or a high fructose corn syrup, or another humectant sugar.

Commercially available high fructose corn syrups, which are the preferred humectants, are prepared by the enzymatic isomerization of dextrose containing corn syrups, and typically possess a sugar solids component of about 40 percent to about 100 percent by weight of fructose, with the balance of the non-fructose sugar solid being primarily dextrose plus minor amounts of other monosaccharides. The sugar solids content of commercially available high fructose corn syrups typically ranges from about 70 percent to about 73 percent, up to about 82 percent by weight. High fructose corn syrups having at least about 80 percent by weight of their solids as fructose are most preferred. Such high fructose corn syrups are low in cost, are highly humectant, provide a pleasant sweet taste, and are readily available commercially. Examples of other humectant sugars include maltose, sorbose, mannose and galactose. When sucrose is employed in the filler cookie dough, the humectant sugar should preferably comprise at least about 13 percent, and most preferably at least about 20 percent, by weight of the total sugar solids content of the filler cookie dough.

In addition to the humectant sugars, a wide variety of humectants which are not sugars and possess a low degree of sweetness relative to sucrose may also be employed in the filler cookie dough. For example, the use of glycerol, sugar alcohols such as mannitol, maltitol, xylitol and sorbitol, and other polyols, as humectants is well known in the art. Additional examples of humectant polyols (i.e. polyhydric alcohols) include humectant glycols such as propylene glycol, hydrogenated glucose syrups, sugar esters, dextrins, and other starch hydrolyzation products. Humectant sugars are preferred because of their sweetness.

The components of the casing dough can be the same as those used in conventional doughs used to produce the outer layer of multi-textured cookies. The sugar used in the casing dough may if desired incorporate sucrose plus a minor proportion of a humectant sugar, which may be any of the humectant sugars mentioned above in the discussion of the filler dough.

The total sugar solids content of the dough or doughs may range from about 25 to about 150 pounds, typically from about 50 to about 110 pounds, per 100 pounds of the flour component of the dough, depending upon the degree of sweetness desired and the type of cookie. In the filler dough bakeable to a soft and moist texture on the basis of 100 pounds of the flour component of the filler dough, the humectant plus any sucrose or other sweetner employed (e.g. artificial sweeteners) in the formulation may be present in amounts ranging from about 25 to about 150 pounds depending on the degree of sweetness and humectant properties desired in the baked product.

The initial moisture content of the dough is adjusted to provide the desired consistency to the dough to enable proper mixing, working and shaping of each dough and of the coextrudate. The total moisture content of each dough will include any water included as a separately added ingredient, as well as the moisture provided by flour (which usually contains about 12% to about 14% by weight moisture), the moisture provided by the optional humectant gel, and the moisture content of other dough additives included in the formulation, such as high fructose corn syrup, invert syrups, or other liquid humectants. Taking into account all sources of moisture in the dough including separately added water, the total initial moisture content of the casing dough is generally less than about 15% by weight of the dough formulation, exclusive of particulate inclusions such as nuts, raisins, chocolate chips, and the like. At moisture contents above about 15% by weight, the dough compositions may tend to stick excessively to processing equipment such as conveyors, dough utters, and the like. The initial moisture content of the filler cookie dough is generally at least about 15% by weight more than the initial moisture content of the casing cookie dough.

Before being combined with the casing dough, the filler cookie dough is preferably cooled to about 60° to about 65° F. (about 15.6° to about 18.3° C.) using carbon dioxide snow to facilitate its transfer to a coextruder.

The two cookie doughs may be combined by coextrusion through concentric dies to obtain a coextrudate rope with the filler dough inside and the casing dough outside. The coextrudate rope is cut into pieces using a reciprocating cutter which severs the rope and stretches the casing dough to close the end portions of the rope so as to obtain a composite dough piece in which a center formed of the filler dough is completely surrounded by an outer layer formed of the casing dough, this composite dough piece thus being bakeable to form a multi-textured cookie.

The composite dough pieces suitably have a weight ratio of the filler dough to the casing dough within the range from about 0.80 to 1.2, approximately equal amounts of each dough being preferred.

The following Examples are now given, by way of illustration only, wherein all parts, ratios and percentages are by weight unless otherwise stated.

EXAMPLE 1

This Example illustrates the preparation of a multi-textured chocolate chip cookie, containing chocolate chips in both the filler and casing doughs, by the process of the present invention.

A casing dough according to the present invention was prepared from the following ingredients:

| Ingredient | Parts by Weight |
| --- | --- |
| Bleached wheat flour | 100.0 |
| Sucrose | 70.0 |
| Vegetable shortening* | 50.0 |
| Low-melting fat (Spray oil**) | 10.0 |
| Dextrose monohydrate | 5.0 |
| Molasses | 2.5 |
| Honey | 3.25 |
| Sodium bicarbonate | 2.13 |
| Sodium acid pyrophosphate | 0.75 |
| Minor flavoring and texturizing ingredients (salt, spray-dried whole eggs and caramel) | 2.56 |
| Water | 19.0 |
| Chocolate drops (4800 counts/lb) | 35.0 |
| | 300.19 |

*The vegetable shortening used had a solid fat index in the range of 14–22 at 80° F.
**The spray oil was stabilized with at least 100 parts per million of TBHQ, and citric acid was added as a chelating agent. The chemical and physical properties of the spray oil was as follows:

| | | |
| --- | --- | --- |
| % Free Fatty Acid (as Oleic) | 0.05 Max | AOCS Method Ca 5a-40 |
| Initial Peroxide Value (Meq/Kilo) | 1.0 Max | AOCS Method Cd 8-53 |
| Color (Lovibond) | 1.5 Red Max | AOCS Method Cc 13b-45 |
| Wiley Melting Point, °F., | 98–103 | AOCS Method Cc 2-38 |
| A.O.M. Stability (hours) | 100 Min | AOCS Method Cd 12-57 |
| % Solid Fat Index | | AOCS Method Cd 10-57 |
| 10° C. (50° F.) | 26.0–31.0 | |
| 21.1° C. (70° F.) | 13.0–18.0 | |

-continued

| | |
|---|---|
| 26.7° C. (80° F.) | 7.0–11.0 |
| 33.3° C. (92° F.) | 3.0–7.0 |
| 37.8° C. (100° F.) | 2.0 Max (normally 0) |
| Congeal Point, °C. | 25.0–29.0 deg AOCS Method Cc 14-59 |

The casing dough was prepared using a Lo Bowl upright mixer. Half the sucrose, together with the vegetable shortening, dextrose, salt, spray-dried eggs, and spray oil were added to the mixer and mixed for three minutes. Next, the molasses, honey, caramel and water were added and mixing continued for a further one minute. The flour, sodium bicarbonate and sodium acid pyrophosphate were then added and the mixing continued for a further two minutes. The remaining half of the sucrose was added and the mixing continued for a further two minutes. Finally, the chocolate drops were added and the mixing continued for a further one minute to prepare the finished casing dough.

A control casing dough was formulated in exactly the same manner, except that the spray oil was omitted.

A filler dough for the process of the invention was formulated from the following ingredients:

| Ingredient | Parts By Weight |
|---|---|
| Bleached wheat flour | 100.0 |
| Sucrose | 25.0 |
| High fructose corn syrup (71% solids, 90% fructose) | 88.5 |
| Honey | 3.5 |
| Modified corn starch | 8.5 |
| Non-fat dried milk solids | 4.0 |
| Sodium bicarbonate | 0.75 |
| Ammonium bicarbonate (food grade) | 0.25 |
| Sodium acid pyrophosphate | 0.31 |
| Vegetable shortening* | 47.5 |
| Minor flavoring and coloring ingredients (spray-dried whole eggs, salt and caramel) | 3.19 |
| Water | 11.0 |
| Chocolate drops (2000 counts/lb) | 75.0 |
| | 367.5 |

*The vegetable shortening was the same as that used in the casing dough described above.

The filler dough was prepared using the same type mixer and blade speed as the casing dough. The sugar, vegetable shortening, starch, non-fat dried milk solids, spray-dried whole eggs and salt were placed in the mixing bowl and mixed for three minutes. The ammonium bicarbonate was then added dissolved in part of the water, together with the caramel, the remaining water, the high fructose corn syrup and the honey and the mixing continued a further two minutes. The flour, sodium bicarbonate and sodium acid pyrophosphate were then added and the mixing continued for a further three minutes. Finally, the chocolate drops were added and the mixing continued for a further one minute to produce the finished filler dough.

A control filler dough was prepared in exactly the same manner except that the amount of vegetable shortening was reduced to 38.0 parts by weight.

The casing and filler doughs according to the invention were then combined by coextrusion through a concentric die into a coextrudate rope in which a cylinder of the filler dough was surrounded by the casing dough. This rope was severed with a reciprocating cutter having hemispherically shaped dough forming sections to form composite dough pieces in which a center comprising approximately 6.5 grams of the filler dough was surrounded by an outer layer comprising approximately 6.5 grams of the casing dough. These composite dough pieces were then baked to 400° F. (204° C.) for 7.5 minutes.

The control filler and casing doughs were also combined and baked in the same manner. It was found that the cookies of the present invention exhibited less halo effect than the control cookies.

EXAMPLE 2

This Example illustrates the preparation of a multi-textured chocolate chip cookie, containing chocolate chips in both the filler and casing doughs and in which the casing dough contains an emulsifier, by the process of the present invention.

A casing dough according to the present invention was prepared from the following ingredients:

| Ingredient | Parts by Weight |
|---|---|
| Bleached wheat flour | 500.0 |
| Sucrose | 325.0 |
| Vegetable shortening* | 250.0 |
| Low-melting fat (Spray oil**) | 37.5 |
| Dextrose monohydrate | 25.0 |
| Molasses | 12.5 |
| Honey | 16.25 |
| Sodium bicarbonate | 11.25 |
| Sodium acid pyrophosphate | 3.75 |
| Calcium stearoyl-2-lactylate | 7.5 |
| Minor flavoring and texturizing ingredients (salt, spray-dried whole eggs, vanilla flavor and caramel) | 13.56 |
| Water | 85.0 |
| Chocolate drops (4800 counts/lb) | 175.0 |
| | 1462.3 |

*The vegetable shortening used was the same as in Example 1 above.
**The spray oil used was the same as in Example 1 above.

The casing dough was prepared in substantially the same manner as in Example 1 above except that only 155 parts by weight of the sucrose were added during the creaming stage; the calcium stearoyl-2-lactylate was added with the spray oil and the vanilla was also added to the initial mixture.

A filler dough was formulated from the following ingredients:

| Ingredient | Parts by Weight |
|---|---|
| Bleached wheat flour | 600.0 |
| Sucrose | 150.0 |
| Vegetable shortening* | 285.0 |
| High fructose corn syrup (71% solids, 90% fructose) | 558.0 |
| Honey | 21.0 |
| Modified corn starch | 51.0 |
| Non-fat dried milk solids | 24.0 |
| Sodium bicarbonate | 6.0 |
| Ammonium bicarbonate (food grade) | 1.5 |
| Sodium acid pyrophosphate | 1.88 |
| Minor flavoring and coloring ingredients (spray-dried whole eggs, vanilla flavor, salt and caramel) | 20.0 |
| Water | 30.0 |
| Chocolate drops (2000 counts/lb) | 350.0 |
| | 2098.4 |

*The vegetable shortening was the same as that used in the casing dough described above.

The casing dough was prepared using the same type mixer and blade speed as the casing dough. The sugar, 200 parts by weight of the flour, vegetable shortening, starch, non-fat dried milk solids, spray-dried whole eggs, salt and vanilla were placed in the mixing bowl and mixed for three minutes. The ammonium bicarbonate was then added dissolved in part of the water, together with the caramel, and the remaining water and mixed for 2 minutes. Next, the high fructose corn syrup and the honey were added and the mixing continued a further one minute. The flour, sodium bicarbonate and sodium acid pyrophosphate were then added and the mixing continued for a further three minutes. Finally, the chocolate drops were added and the mixing continued for a further one minute to produce the finished filler dough.

The two cookie doughs were then combined and baked as in Example 1 above. Three days after baking, the resultant cookies were free of blonde chips and halo effects.

EXAMPLE 3

This Example illustrates the preparation of a multi-textured chocolate chip cookie, containing chocolate chips with added butterfat in both the filler and casing doughs, by the process of the present invention.

A casing dough according to the present invention was prepared from the following ingredients:

| Ingredient | Parts by Weight |
| --- | --- |
| Bleached wheat flour | 100.0 |
| Sucrose | 68.0 |
| Vegetable shortening* | 50.0 |
| Low-melting fat (Spray oil*) | 7.5 |
| Calcium stearoyl-2-lactylate | 2.0 |
| Dextrose monohydrate | 5.0 |
| Molasses | 2.5 |
| High fructose corn syrup (71% solids, 90% fructose) | 3.0 |
| Honey | 3.25 |
| Sodium bicarbonate | 2.13 |
| Sodium acid pyrophosphate | 0.75 |
| Minor flavoring and texturizing ingredients (salt, spray-dried whole eggs and caramel) | 2.56 |
| Water | 16.0 |
| Chocolate drops (4800 counts/lb 4 percent by weight added butterfat) | 35.69 |
| | 298.38 |

*The vegetable shortening and spray oil were the same as in Example 1 above.

The casing dough was prepared in the same manner as in Example 2 above.

A filler dough for the process of the invention was formulated from the following ingredients:

| Ingredient | Parts by Weight |
| --- | --- |
| Bleached wheat flour | 100.0 |
| Sucrose | 25.0 |
| High fructose corn syrup (71% solids, 90% fructose) | 93.0 |
| Honey | 3.5 |
| Modified corn starch | 8.5 |
| Non-fat dried milk solids | 4.0 |
| Sodium bicarbonate | 0.75 |
| Ammonium bicarbonate (food grade) | 0.25 |
| Sodium acid pyrophosphate | 0.31 |
| Vegetable shortening* | 47.5 |
| Minor flavoring and coloring ingredients (spray-dried whole eggs, salt and caramel) | 3.19 |
| Water | 10.0 |
| Chocolate drops (2000 counts/lb, 4 percent added butterfat) | 35.69 |
| | 331.7 |

*The vegetable shortening was the same as that used in the casing dough described above.

The filler dough was prepared and the two cookie doughs combined and baked, in the same manner as in Example 2 above. Three days after baking, the resultant cookies were free of blonde chocolate chips and halo effects.

Similar cookies were prepared using in both doughs, chocolate chips containing 34 percent cocoabutter without added butterfat. The resultant cookies were free from halo and blonde chocolate chip effects, but upon storage showed a tendency to develop fat bloom on the chips.

We claim:

1. A cookie dough composition for preparing a cookie less susceptible to halo and bloom effects, said composition comprising flour, a sugar, chocolate chips, fat or shortening having a solid fat index in the range of about 15 to about 25 percent at 70° F., said fat or shortening being solid up to at least about 80° F., and a low-melting fat, the low-melting fat having a solid fat index of from about 18 to 31 at 50° F., a solid fat index of from about 7 to about 11 at 80° F. and being essentially completely liquid at about 100° F., the low-melting fat comprising from about 5 to about 30 percent by weight of the total weight of fat and shortening in the cookie dough composition.

2. A composition according to claim 1 wherein the low-melting fat comprises from about 12 to about 25 percent by weight of the total weight of fat and shortening in the cookie dough composition.

3. A composition according to claim 1 wherein the low-melting fat comprises at least one partially hydrogenated vegetable oil.

4. A composition according to claim 1 wherein the chocolate chips contain butterfat in an amount of at least about 2 percent by weight of the chocolate chips.

5. A composition according to claim 1 wherein the chocolate chips comprise an emulsifier in an amount of at least about 0.2 percent by weight of the chocolate chips.

6. A composition according to claim 5 wherein the emulsifier comprises at least one of sorbitan monostearate and polyoxyalkylene sorbitan fatty acid esters.

7. A process according to claim 1 wherein the dough comprises an emulsifier in amount of at least about 1 percent by weight of the flour in the dough.

8. A composition according to claim 7 wherein the emulsifier comprises at least one of calcium stearoyl-2-lactylate, sodium stearoyl-2-lactylate, sorbitan monostearate, mono- and di- glycerides and polyoxyalkylene sorbitan fatty acid esters.

9. A composition according to claim 1 in the form of a composite dough piece comprising a center formed of a first cookie dough comprising flour, a humectant and fat or shortening and bakeable to a soft texture, and an outer layer formed of the dough containing the low-melting fat.

10. A cookie prepared by baking a cookie dough composition according to claim 1.

11. A process for preparing a multi-textured cookie, which process comprises:

mixing flour, a humectant and fat or shortening to form a first cookie dough;

mixing flour, a sugar, fat or shortening having a solid fat index in the range of about 15 to about 25 percent at 70° F., said fat or shortening being solid up to at least about 80° F., and a low-melting fat to form a second cookie dough, the low-melting fat having a solid fat index of from about 18 to 31 at 50° F., a solid fat index of from about 7 to about 11 at 80° F. and being essentially completely liquid at 100° F., the low-melting fat comprising from about 5 to about 30 percent by weight of the total weight of fat and shortening in the second cookie dough;

enrobing a portion of the first cookie dough within a portion of the second cookie dough to produce a composite dough piece; and baking the composite dough piece to form a multi-textured cookie with a soft-textured center and a firm outer layer.

12. A process according to claim 11 wherein the low-melting fat comprises from about 12 to about 25 percent by weight of the total weight of the fat and shortening in the second cookie dough.

13. A process according to claim 11 wherein the low-melting fat comprises at least one partially hydrogenated vegetable oil.

14. A process according to claim 11 wherein the humectant in the first cookie dough comprises a sucrose gel.

15. A process according to claim 11 wherein the humectant in the first cookie dough comprises a high fructose corn syrup gel.

16. A process according to claim 11 wherein the first cookie dough comprises at least about 42 percent by weight of fat and shortening based on the weight of the flour in the first cookie dough.

17. A process according to claim 11 wherein the baking is continued until the moisture content of the cookie is in the range of from about 6.5 to about 7.5 percent by weight.

18. A process according to claim 11 wherein flavor particles are added to at least one of the first and second cookie doughs.

19. A process according to claim 18 wherein the flavor particles are added to both cookie doughs.

20. A process according to claim 18 wherein the flavor particles comprise chocolate chips.

21. A process according to claim 18 wherein the chocolate chips added to the second cookie dough contain butterfat in an amount of at least about 2 percent by weight of the chocolate chips.

22. A process according to claim 20 wherein the chocolate chips comprise an emulsifier in an amount of at least about 0.2 percent by weight of the chocolate chips.

23. A process according to claim 22 wherein the emulsifier comprises at least one of sorbitan monostearate and polyoxyalkylene sorbitan fatty acid esters.

24. A process according to claim 20 wherein at least one dough containing chocolate chips further comprises an emulsifier in an amount of at least about 0.5 percent by weight of the flour in that dough.

25. A process according to claim 24 wherein the emulsifier comprises at least one of sorbitan monostearate and polyoxyalkylene sorbitan fatty acid esters.

26. A multi-textured cookie prepared by a process according to claim 29.

* * * * *